(12) United States Patent
Horie et al.

(10) Patent No.: US 6,287,727 B1
(45) Date of Patent: Sep. 11, 2001

(54) MANGANESE-LITHIUM ION ELECTROLYTIC CELL

(75) Inventors: Hideaki Horie; Mikio Kawai; Takaaki Abe; Toyoaki Nakagawa; Yuuji Tanjo; Ken Iwai, all of Kanagawa-ken (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/352,759

(22) Filed: Jul. 14, 1999

(30) Foreign Application Priority Data

Jul. 15, 1998 (JP) .................................. 10-200320

(51) Int. Cl.[7] ........................................ H01M 4/50
(52) U.S. Cl. ................. 429/224; 429/217; 429/218.1; 429/221; 429/223; 429/231.5
(58) Field of Search .................................. 429/224, 217, 429/218.1, 223, 231.5, 221

(56) References Cited

U.S. PATENT DOCUMENTS

| | | | |
|---|---|---|---|
| 5,705,291 | * | 1/1998 | Amatucci et al. .................... 429/137 |
| 5,789,114 | * | 8/1998 | Adachi et al. ....................... 429/232 |
| 5,856,044 | * | 1/1999 | McLin et al. ...................... 429/218.1 |
| 5,916,516 | * | 6/1999 | Kolb .................................. 429/218.1 |

* cited by examiner

Primary Examiner—Laura Weiner
(74) Attorney, Agent, or Firm—Foley & Lardner

(57) ABSTRACT

There is provided a positive electrode comprising positive electrode active material granules which each are composed of lithium manganate; and a first surface layer which is formed on each of the positive electrode active material granules and is to transmit lithium (Li) ion but not manganese (Mn) ion therethrough.

8 Claims, 2 Drawing Sheets

ADDED AMOUNT BY VOLUME OF CONDUCTIVE POLYMER RELATIVE TO POSITIVE ELECTRODE ACTIVE MATERIAL GRANULES (%)

ADDED AMOUNT BY VOLUME OF CONDUCTIVE POLYMER RELATIVE TO POSITIVE ELECTRODE ACTIVE MATERIAL GRANULES (%)

MANGANESE-LITHIUM ION ELECTROLYTIC CELL

BACKGROUND OF THE INVENTION

1. Field of the Invention

The present invention relates to a lithium ion electrolytic cell using a manganic material.

2. Description of Relevant Art

There are known a cobalt-lithium ion electrolytic cell using lithium cobaltate and a manganese-lithium ion electrolytic cell using lithium manganate, as a positive electrode of a secondary electrolytic cell.

SUMMARY OF THE INVENTION

While the cost of the material of a manganese-lithium ion electrolytic cell is lower than that of the material of a cobalt-lithium ion electrolytic cell, manganese (Mn) ion in the positive electrode active material of the former is high in the dissolution into its electrolytic solution. Moreover, the lifetime of the manganese-lithium ion electrolytic cell is short.

An object of the present invention is to suppress the dissolution of Mn to prevent the deterioration of a manganese-lithium ion electrolytic cell and make its lifetime longer.

To achieve the object described above, the present invention provides a manganese-lithium ion cell, comprising: a positive electrode comprising: positive electrode active material granules which are each composed of lithium manganate; and a first surface layer is formed on each of the positive electrode active material granules and is to transmit lithium (Li) ion but not manganese (Mn) ion therethrough.

BRIEF DESCRIPTION OF THE ACCOMPANYING DRAWINGS

DETAILED DESCRIPTION OF THE PREFRRED EMBODIMENTS

Embodiments of the present invention will be described hereinafter, referring to the accompanying drawings.

Figure 1:
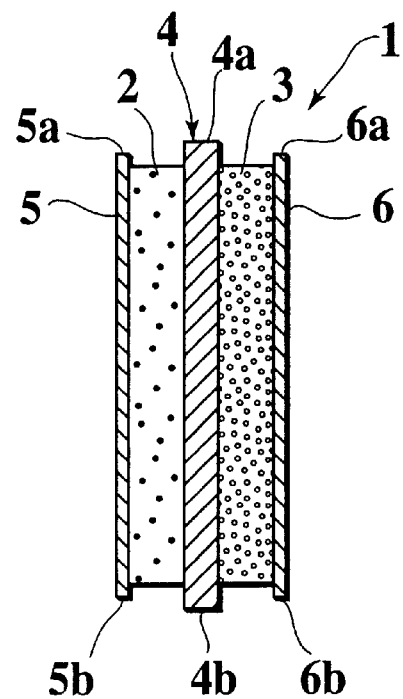
FIG. 1 shows a sectional structure of main elements of a lithium ion electrolytic cell according to embodiments of the invention.

FIG. 1 shows a sectional structure of main elements of a lithium ion electrolytic cell.

This lithium ion electrolytic cell 1 is composed of a positive electrode 2, a negative electrode 3, a separator 4 for separating the positive electrode 2 and the negative electrode 3, a positive electrode current collector 5 connecting to the positive electrode 1, and a negative electrode current collector 6 connecting to the negative electrode 3.

The positive electrode 2 is made of a manganic oxide as a positive electrode active material, and this manganic oxide has, for example, spinel crystal structure ($LiMn_2O_4$).

The negative electrode 3 is made of a carbon material, and may be made of a graphitic material comprising graphite, or of a carbonaceous material having a partial structure of graphitic structure.

Figure 2:
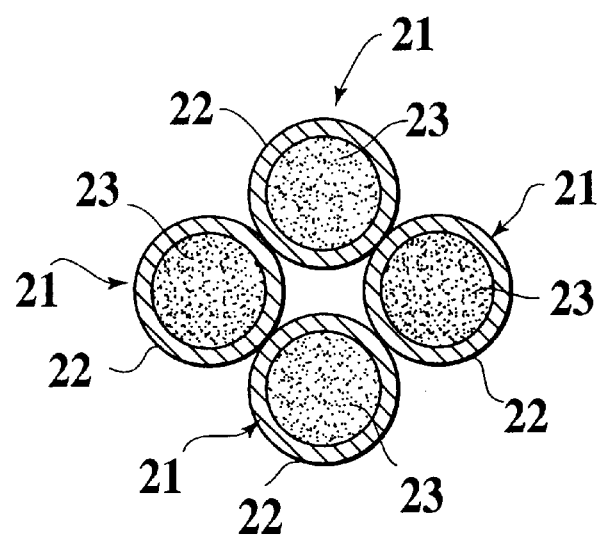
FIG. 2 is an enlarged view of granules of positive electrode active material of the lithium ion cell shown in FIG. 1.

FIG. 2 is an enlarged view showing positive electrode active material of the lithium ion electrolytic cell shown in FIG. 1.

The surfaces of active material granules 21 of the positive electrode 2 are coated with a material which is high in resistances against the electrolytic solution, dissolution ability and oxidation, to form surface layers 22. Thus, manganese (Mn) 23 inside the granules 21 is suppressed so that the lifetime of the positive electrode is prolonged and the reliability thereof is improved.

It is preferable from the standpoint of the dissolution of Mn 23 inside the granules 21 that the thickness of the surface layer 22 is larger. However, from the standpoint of performance of the cell and reduction in the cost of the material of the surface layer, the volume percentage of surface layers 22 is preferably 20% or less relative to the granules 21. From the standpoint of sufficient suppression of the dissolution of Mn 23 inside the granules 21, the volume percentage of the surface layers 22 is preferably 2% or more relative to the granules 21. Furthermore, in order to cope with both the standpoints, the volume percentage of the surface layers 22 is desirably from about 5–8% by volume relative to the granules 21.

The material of the surface layer 22 is preferably a material having a high transmission of lithium (Li) ion and electron, and a high capability of suppressing the dissolution of Mn 23 inside the granules 21. Besides, in the light of the fact that the active material granules 21 contact each other through the surface layers 22, the material of the surface layer 22 is preferably a material making the resistance between the granules 21 lower, and making the flow of electrons inside the granules 21 better, and making the current collecting effect inside the granules 21 higher.

The following will describe examples of the material of the surface layer 22 of the positive electrode active material granules 21.

FIRST EXAMPLE

An electrically conductive polymer through which any lithium ion is transmitted but any Mn ion is not transmitted, which will be referred to as a lithium ion conductive polymer, may be made up to a first surface layer 22. In this case, the dissolution of Mn inside a positive electrode active material granule 21 can be suppressed.

Example of lithium ion conductive polymer include one of polyethylene oxide, polypropylene oxide, polyacetylene, polyaniline, polypyrrole, polymethyl methacrylate, polyacrylonitrile, and polyvinylidene fluoride.

For example, 10% by volume of polyethylene oxide precursor, as a lithium ion conductive polymer, and 4% by volume of an auxiliary conductive agent such as carbon black, acetylene black, graphite are added to granules of lithium manganate which each have a size of 4 μm or less. A solvent such as propylene carbonate is added thereto, and then the resultant is kneaded and heat-treated at 120° C. for 20 minutes to form a polyethylene oxide film on a whole surface of the granules of lithium manganate. This active material is applied to a current collector foil to make up a positive electrode.

SECOND EXAMPLE

Mn in a part of a surface region in each positive electrode active material granules 21 is replaced by a transition element to form a second surface layer 22. Example of used transition element include one of Sc, Ti, V, Cr, Fe, Ni and rare-earth element.

THIRD EXAMPLE

Mn in a part of a surface region of the positive electrode active material granule 21 is replaced by cobalt (Co), to form a second surface layer 22. That is, Co is added to Mn in the surface region of the granule to form cobalt-adding manganic spinel.

Since addition of Co makes a Mn crystal structure of the second surface layer 22 stable, the effect of suppressing the dissolution of Mn inside the granule is further improved. The addition of Co, which has a high electric conductance, to the surface layer 22 causes a Co rich layer to be generated in a network form in the surface region of the positive electrode active material granule 21, so that the resistance between the granules 21 is lowered and an electric current inside granules 21 can easily flow. Thus, the input/output property of the cell is improved.

FOURTH EXAMPLE

A surface layer 22 is formed to stack a first layer of lithium ion conductive polymer on a second layer in which Mn in a part of a surface region of lithium manganate is replaced by a transition element. According to the surface layer, the same benefit as the above-mentioned surface layer can be obtained.

FIFTH EXAMPLE

The following is formed: a second layer wherein the lithium ratio in each surface region of granules of spinel type lithium manganate is 5% more than that of the stoichiometry in granules of lithium manganate, granule size of which is 10 $\mu$m, that is, a layer of Li 1+xMn 2+y O4 wherein X is 0.05. 6% by volume of polypropylene oxide, as a lithium ion conductive polymer, and 4% by volume of an auxiliary conductive agent are added to the periphery of the above-mentioned second layer. A solvent is added thereto, and then the resultant is kneaded and heat-treated to form a polypropylene oxide film as a fist layer on each second surface layer of the granules of the spinel type lithium manganate. In this manner, a cell material is made wherein the conductivity of a lithium ion is not blocked at the jointing interface between the polymer and the granule and Mn ion is not diffused into the polymer so as to exhibit a high endurance at high temperatures.

Evaluation Test

Figure 3:
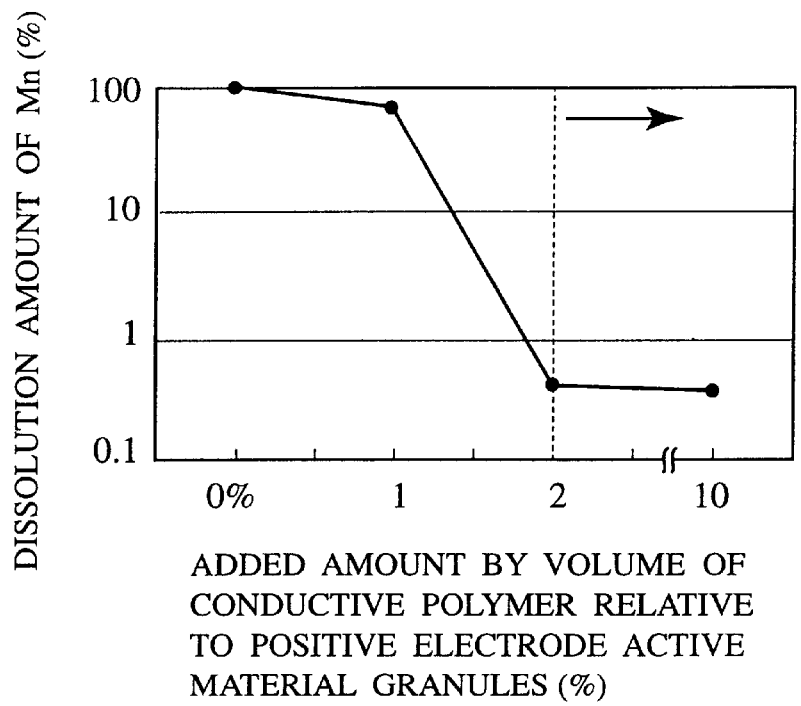
FIG. 3 is a graph showing the dissolution amounts of Mn relative to the volume ratios of a conductive polymer added versus positive electrode active material granules.

FIG. 3 shows results in the case that a lithium ion conductive polymer, that is, polyethylene oxide was added to positive electrode active material granules of lithium manganate and then the dissolution amount of Mn as the positive electrode was measured by an inductively coupled plasma spectroscopy.

The size of the granules of the positive electrode active material ranges from 0.5 to 10 $\mu$m.

A sample was immersed into an organic solvent of propylene carbonate and $LiPF_6$, the temperature of which was set to 70° C., and after 4 days from the immersion the concentration of Mn ion in the organic solvent was measured. As a reference, a sample wherein any conductive polymer was not added to the same positive electrode active material as above was used. Its concentration of Mn ion under the above-mentioned conditions was defined as 100%. In this way, an evaluation was made.

According to the results, the dissolution amount of Mn ion was abruptly reduced as the added amount of the conductive polymer increased. When the added amount of the polymer became 2% or more by volume relative to the granules, the dissolution amount of Mn ion became substantially constant.

This fact demonstrates that by defining the added amount of the polymer as 2% or more, the surface of the granules of the positive electrode active material is coated with the polymer so that the dissolution amount of Mn ion is greatly reduced.

Figure 4:
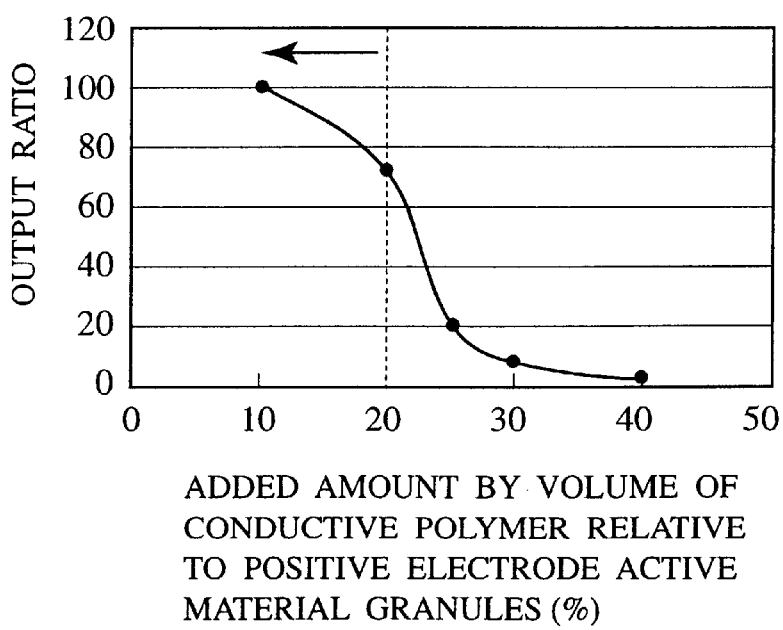
FIG. 4 is a graph showing output ratios relatives to the volume ratios of conductive polymer added versus positive electrode active material granules.

FIG. 4 shows output ratios of a cell versus the added amounts of the conductive polymer.

In the output ratio measurement, the output was obtained by calculating an internal resistance at constant-current discharge by using a small size cell (an area of approximately 2 $cm^2$) and a Li-metal pole as a counter electrode (a negative electrode). The output in the case that the added amount of the polymer was 10% was defined as 100. In this way, an evaluation was made. According to the results, when the added amount of the polymer is over 20% by volume relative to the granules, the output ratio thereof is remarkably lowered. This is because the electrolytic solution is not transmitted to the positive electrode active material granules by the polymer layer when the added amount of the polymer is over 20% by volume, thereby lowering the performance of the cell.

From the above, the added amount of the polymer is preferably from 2% to 20% by volume relative to the positive electrode active material granules. In this manner, not less than 90% and preferably not less than 98% of each surface of the granules of lithium manganate are coated with the lithium ion conductive polymer. Moreover, from the above-mentioned results, the added amount of the polymer is desirably from 5–8% by volume.

The entire content of Japanese patent Application P-10-200320 (filed Jul. 15, 1998) is incorporated herein by reference.

Although the invention has been described above by reference to certain embodiments of the invention, the invention is not limited to the embodiments described above. Modifications and variations of the embodiments described above will occur to those skilled in the art, in light of the above teachings. The scope of the invention is defined with reference to the following claims.

What is claimed is:

1. A manganese-lithium ion cell comprising:
   a positive electrode comprising:
   a plurality of positive electrode active material granules each composed of lithium manganate; and
   a manganese ion impermeable surface layer formed on each of the positive electrode active material granules, the manganese ion impermeable surface layer permitting lithium (Li) ion but not manganese (Mn) ion to pass therethrough;
   wherein said manganese ion permeable surface layer is composed of conductive polymer.

2. A manganese-lithium ion cell according to claim 1, wherein said conductive polymer includes one of polyethylene oxide, polypropylene oxide, polyacetylene, polyaniline, polypyrrole, polymethyl methacrylate, polyacrylonitrile, or polyvinylidene fluoride.

3. A manganese-lithium ion cell according to claim 1, wherein the manganese ion impermeable ion layer is from 2% to 20% by volume relative to the volume of said positive electrode active material granules.

4. A manganese-lithium ion cell according to claim 1, wherein the manganese ion impermeable ion layer is from 5% to 8% by volume relative to the volume of said positive electrode active material granules.

5. A manganese-lithium ion cell comprising:

a positive electrode comprising:

a plurality of positive electrode active material granules each composed of lithium manganate; and a manganese ion impermeable surface layer formed on each of the positive electrode active material granules, the manganese ion impermeable surface layer permitting lithium (Li) ion but not manganese (Mn) ion to pass therethrough;

wherein the manganese ion impermeable surface layer comprises an outermost surface region of each positive electrode active material granules wherein Mn is replaced by a transition element or a rare-earth element.

6. A manganese-lithium ion cell according to claim 5, wherein said transition element includes one of Sc, Ti, V, Cr, Fe, Co or Ni.

7. A manganese-lithium ion cell according to claim 5, further comprising a second manganese ion impermeable layer formed over the first said manganese ion impermeable layer, the second manganese ion impermeable layer comprising a conductive polymer.

8. A manganese-lithium ion cell according to claim 7, wherein the conductive polymer includes one of polyethylene oxide, polypropylene oxide, polyacetylene, polyaniline, polypyrrole, polymethyl methacrylate, polyacrylonitrile or polyvinylidene fluoride.

* * * * *